Oct. 9, 1934.  U. G. THOMAS  1,975,877
DRIVE COUPLING
Filed April 24, 1933  2 Sheets-Sheet 2
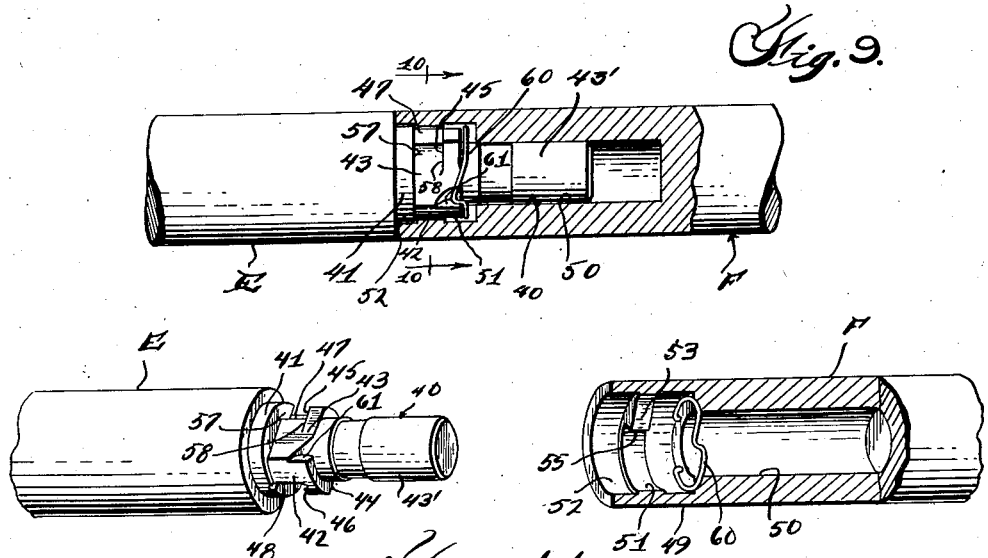
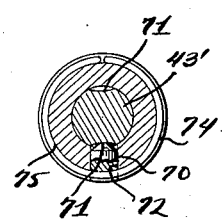
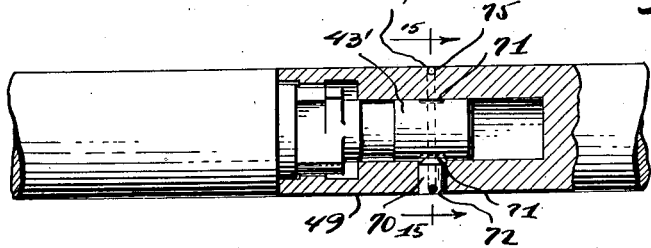
Inventor
Urving G. Thomas Patented Oct. 9, 1934

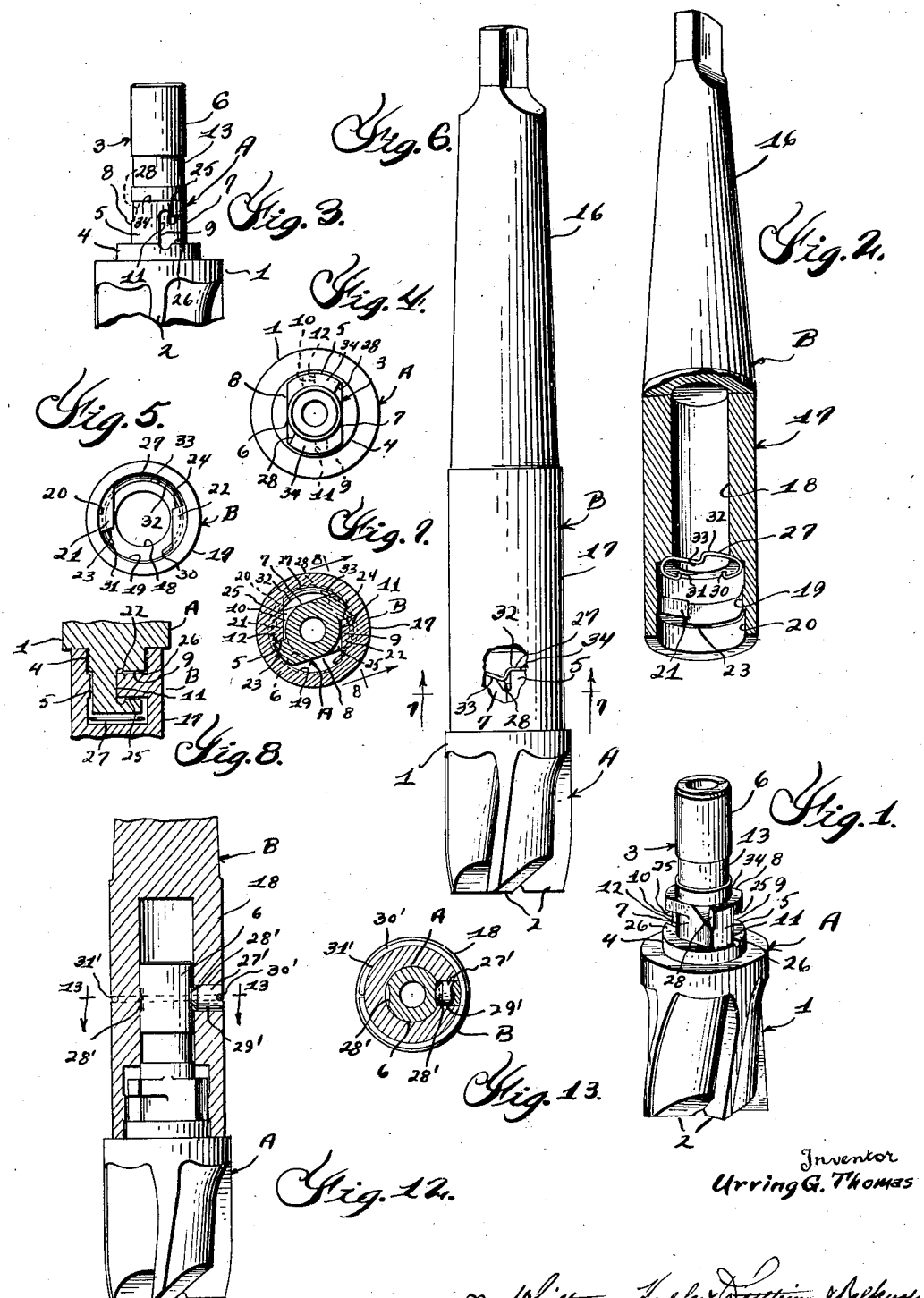

1,975,877

UNITED STATES PATENT OFFICE 1,975,877

DRIVE COUPLING

Urving G. Thomas, Detroit, Mich., assignor to Eclipse Counterbore Company, Detroit, Mich., a corporation of Michigan Application April 24, 1933, Serial No. 667,756

9 Claims. (Cl. 279—93)

This invention relates generally to unions or couplings between separable parts having a common axis and refers more particularly to a coupling between a tool such as a counterbore and its rotary holder.

Heretofore the couplings between such parts have been constructed in such a way that they produced a camming or wedging action which had a tendency to expand or split open the outer sleeve or holder when the couplings were subjected to heavy work. Consequently the walls of the sleeves had to be quite thick to withstand such strains and stresses. In fact, it was customary to thicken the walls of the sleeves according to the wedging action they had to resist. However, this thickening of the walls not only involved the use of additional stock which added to the cost of manufacture, but caused the sleeves to be objectionably large.

In the present instance, the coupling is such that the socket portion or holder will be free of expanding or splitting action, consequently the walls may be thinner, less stock will be needed, the holder may be smaller in diameter, and the cost of manufacturing such devices will be less. Moreover, a stronger, firmer and more efficient drive is provided between the parts.

In the accompanying drawings:

Figure 1 is a detail perspective view of a tool embodying my invention;

Figure 2 is a perspective view of a holder for the tool, showing parts broken away and in section;

Figure 3 is a fragmentary elevation of the tool illustrated in Figure 1;

Figure 4 is an end elevation of the construction illustrated in Figure 3;

Figure 5 is an end elevation of the holder;

Figure 6 is an elevation of the tool and holder in assembled relation;

Figure 7 is a sectional view taken on the line 7—7 of Figure 6;

Figure 8 is a sectional view taken on the line 8—8 of Figure 7;

Figure 9 is a fragmentary side elevation of a slight modification with parts broken away and in section;

Figure 10 is a sectional view on the line 10—10 of Figure 9;

Figure 11 is a group perspective of the construction illustrated in Figure 9 with parts broken away and in section;

Figure 12 is a side elevation of another modification with parts broken away and in section;

Figure 13 is a sectional view taken on the line 13—13 of Figure 12;

Figure 14 is a side elevation of another modification with parts broken away and in section;

Figure 15 is a sectional view taken on the line 15—15 of Figure 14.

Referring now to the drawing, A is a counterboring tool or cutter and B is a sleeve or holder therefor of an assembly embodying my invention.

As shown, the tool A has a head 1 provided with cutting elements or blades 2 and has a shank 3 integral with and extending endwise from said head. Preferably the shank 3 has a circular portion 4 at the inner end of the head, a slightly reduced portion 5 at the inner end of the circular portion, and a greatly reduced cylindrical portion 6 at the inner end of the portion 5. The intermediate portion 5 is provided at diametrically opposite points thereof with flat faces 7 and 8, respectively, and has short grooves 9 and 10, respectively, extending circumferentially thereof in the same direction from the remote ends of said flat faces. Preferably the ends 11 and 12 are flat and extend radially of the shank at diametrically opposite points thereof. The reduced cylindrical portion 6 has an annular groove 13 in which suitable indicia such as the name of the company and the size of the cutting head may be impressed.

The holder B has a driving shank 16 of conventional design and is provided at the inner end of said shank with a cylindrical portion 17 having aligned bores 18, 19 and 20, respectively, for receiving the portion 6, 5 and 4, respectively, of the tool shank. The inside diameters of bores 18 and 20 are substantially equal to the outside diameter of the portions 6 and 4 so that a relatively snug fit is obtained when the parts are assembled. To establish a driving connection between the holder B and tool A, the intermediate bore 19 is provided with oppositely disposed driving lugs 21 and 22, respectively, which are engageable with the grooves 9 and 10 in the cutter and preferably have radially extending flat ends 23 and 24, respectively, at diametrically opposite points of the bore for engagement with the flat ends 11 and 12 of the grooves 9 and 10.

In use, the tool A may be coupled to the holder B by simply inserting the shank 3 into the cylindrical portion 17 of the holder so that the portions 6, 5 and 4, respectively, will engage the bores 18, 19 and 20, and then turning the cutter shank clockwise in the holder until the flat ends 11 and 12, respectively, of the grooves abut the flat ends 23 and 24 of the lugs 21 and 22. When in this position the side walls 25 and 26, respectively, of said grooves will prevent endwise movement of the tool relative to the holder, and some suitable means such as a wire spring 27 within the bore 18 may be used to engage a recess 28 in the intermediate portion 5 of the cutter to hold the latter against turning anti-clockwise in the sleeve B. Preferably opposite ends of the spring are received in holes 30 and 31 in the inner end of the bore 18, while the intermediate portion 32 thereof extends over the inner end of the bore in substantially concentric relation with the axis of the sleeve and has a forwardly projecting offset portion 33. When the shank 3 of the cutter is inserted into the sleeve B the offset portion 33 will abut and be compressed by the forward end 34 of the intermediate portion 5 and will ride upon said end when the cutter is turned in a clockwise direction until the flat ends 11 and 12 of the grooves 9 and 10 in the cutter abut the flat ends 23 and 24 of the lugs 21 and 22 of the sleeve whereupon the offset portion 33 of the spring 27 will be in alignment with and will snap into the recess 28. As an alternative, as illustrated in Figures 12 and 13, the cutter A could be retained in the holder B in locked position by conventional means such as the spring pressed detent 27'. As shown, the portion 6 of the cutter shank may be provided with one or more flattened portions such as 28' which will be engaged by the detent 27' when the cutter is in locked position. Preferably this detent 27' is movable in a transversely extending opening 29' in one side of the portion 18 of the holder and is actuable by a wire spring 30' encircling the holder. Such spring 30' is received within a circumferentially extending groove 31' in the holder and engages the outer end of the detent 27'. Thus the tool will be effectively held against displacement from the holder while in use and the driving forces imparted to the shank 16 of the holder will be transmitted through the abutting ends 11, 12, 23 and 24, respectively, to the shank 3 of the cutting tool. In this connection it will be noted that the flat ends 23 and 24 of the driving lugs and the flat ends 11 and 12 of the grooves are parallel to a line extending diametrically through the center of the tool and that the driving contact between said flat parts is along said line. Consequently there is a direct and positive driving action at diametrically opposite points of the tool instead of the objectionable camming or wedging action heretofore referred to. In fact, the construction is such that a balanced double drive is provided, consequently, the holder will be free of expanding or splitting action and the wall thickness and cross sectional area thereof may be less. Moreover, the construction is such that the tool and holder may be machined from solid stock, hence there are no loose or separate elements associated with the coupling. Another advantage of the construction is that the interlocking parts are located relatively close to the head so that much torque is eliminated. It will also be noted that the portions 4, 5 and 6, respectively, of the tool shank diminish in size in the order given instead of being uniform in size, and that the interlocking means are within the intermediate portion 5 instead of projecting laterally beyond the same or beyond the portions 4 and 6, as heretofore, hence the over-all dimensions of the shank 3 and cylindrical portion 17 of the holder B may be shorter; less stock is required in the manufacture of the tool and holder, and accurate alignment of the tool relative to the holder is insured. Thus my coupling is especially useful in counterboring tools, however, it is intended that the interlocking means may be used for any purpose where two parts are to be united or separated quickly without the use of any other tool. For example, the interlocking means referred to may be used as a coupling between two shafts such as E and F, as illustrated in Figures 9 to 11, inclusive. As shown, the shaft designated E is provided at one end with a shank 40 having a circular portion 41, a slightly reduced portion 42 and a greatly reduced cylindrical portion 43'. The intermediate portion 42 is provided at diametrically opposite points thereof with flat faces 43 and 44, respectively, and has short grooves 45 and 46, respectively, extending circumferentially thereof in the same direction from the remote ends of the flat faces. Preferably the ends 47 and 48 are flat and extend radially of the shank at diametrically opposite points thereof. The other shaft F is provided at one end with a cylindrical portion 49 having aligned bores 50, 51 and 52, respectively, for receiving the portions 43', 42 and 41, respectively, of the shaft E. The inside diameters of bores 50 and 52 are substantially equal to the outside diameter of the portions 43' and 41 so that a relatively snug fit is obtained when the parts are assembled. To establish a driving connection between the shafts E and F the intermediate bore 51 is provided with oppositely disposed driving lugs 53 and 54, respectively which are engageable with the grooves 45 and 46 in the shaft E and preferably have radially extending flat ends 55 and 56, respectively, at diametrically opposite points of the bore for engagement with the flat ends 47 and 48 of the grooves 45 and 46. In use, the shaft E may be coupled to the shaft F by simply inserting the shank 40 into the cylindrical portion 49 so that the portions 43', 42 and 41, respectively, will engage the bores 50, 51 and 52, and then turning the shaft E clockwise relative to the shaft F until the flat ends 47 and 48, respectively, of the grooves abut the flat ends 55 and 56 of the lugs 53 and 54. When in this position the side walls 57 and 58, respectively, of said grooves will prevent endwise movement of the shaft E relative to the shaft F, and some suitable means such as a wire spring 60 within the bore 52 may be used to engage a recess 61 in the intermediate portion 42 of the shaft E to hold the latter against turning anti-clockwise in the shaft F. Thus the shaft E will be effectively held against displacement from the shaft F while in use and the driving forces imparted to the shaft F will be transmitted through the abutting ends 47, 48, 55 and 56, respectively, to the shaft E.

If desired, the shaft E could be retained in the shaft F in locked position by the conventional spring pressed detent 70, as illustrated in Figures 14 and 15, respectively. As shown, the portion 43' of the shaft E may be provided with one or more flattened portions such as 71 which will be engaged by the detent 70 when the shaft E is in locked position. Preferably this detent 70 is movable in a transversely extending opening 72 in one side of the portion 49 of the shaft F and is actuable by a wire spring 74 encircling the shaft F. Preferably such spring 74 is received in a circumferentially extending groove 75 in the shaft F and engages the outer end of the detent 70.

What I claim as my invention is:
1. A driving member having a socket and a bore for the reception of a shank of a driven member, the bore extending inwardly from the inner end of the socket and providing a shoulder at the juncture thereof, driving elements within the socket in spaced relation to the shoulder, and a detent within the socket between the shoulder and elements including a wire spring terminally secured to the shoulder and having an intermediate portion in registration with the shoulder affording clearance for the insertion into the bore of the shank of the driven element and having a forwardly extending offset portion for latching engagement with the driven element when the shank is within the bore.

2. A driving member having a socket and a bore for the reception of a shank of a driven member, the bore extending inwardly from the inner end of the socket and providing a shoulder at the juncture thereof, driving elements within the socket in spaced relation to the shoulder, and a detent within the socket between the shoulder and elements including an arcuate spring having rearwardly extending portions secured to the shoulder and having a forwardly extending portion for latching engagement with the driven element when the shank thereof is within the socket.

3. In combination, a driving member provided at one end with a socket and having a bore extending inwardly from the inner end of the socket, the socket being provided at substantially diametrically opposite points thereof in spaced relation to the outer end of the bore with driving lugs, and a driven member having a shank provided with a portion fitting the socket upon the outer sides of the lugs, flat portions for movement between the lugs, grooves for the lugs extending circumferentially thereof from the flat portions and having ends providing driving faces for the lugs, and a reduced pilot portion fitting the bore.

4. In combination, a driving member provided at one end with a socket and having a bore extending inwardly from the inner end of the socket, the socket being provided at substantially diametrically opposite points thereof in spaced relation to the outer end of the bore with driving lugs, and a driven member having a shank provided with a portion fitting the socket upon the outer sides of the lugs, flat portions for movement between the lugs, grooves for the lugs extending circumferentially thereof from the flat portions and having ends providing driving faces for the lugs, and a reduced portion beyond the flat portions fitting the bore.

5. In combination, a driving member provided at one end with a socket and having a bore extending inwardly from the inner end of the socket, the socket being provided at substantially diametrically opposite points thereof in spaced relation to the outer end of the bore with driving lugs, a detent within the socket, and a driven member having a shank provided with a portion fitting the socket upon the outer sides of the lugs, flat portions for movement between the lugs, one of said flat portions having a notch therein for the reception of the detent, grooves for the lugs extending circumferentially thereof from the flat portions and having ends providing driving faces for the lugs when the detent is received within the notch, and a reduced portion beyond the flat portions fitting the bore.

6. In combination, a driven member having a shank provided at diametrically opposite points thereof with flat faces and having short grooves extending circumferentially thereof in the same direction from the remote ends of said faces, the ends of said grooves being flat and extending radially of the shank, and a driving member having a socket receiving the shank and provided at substantially diametrically opposite points thereof with driving lugs for engagement with the grooves aforesaid, said lugs having radially extending flat ends for engagement with the flat ends of the grooves.

7. In combination, a driving member provided at one end with a socket and having a bore extending inwardly from the inner end of said socket, said socket being provided at diametrically opposite points thereof in spaced relation to the outer end of the bore with driving lugs, a driven member having a shank provided with a portion fitting the socket upon the outer sides of the lugs, having flat portions extending longitudinally thereof from the portion just mentioned for movement between the lugs, having grooves for the lugs extending circumferentially thereof from the flat portions and having ends providing driving faces for the lugs, and having a reduced pilot portion fitting the bore, and means operable when the lugs and driving faces are in engagement for maintaining such engagement, including a yieldable element nested within one of said members and having a detent portion engageable with the other of said members.

8. In combination, a driving member provided at one end with a socket and having a bore extending inwardly from the inner end of said socket, said socket being provided at diametrically opposite points thereof in spaced relation to the outer end of the bore with driving lugs, a driven member having a shank provided with a portion fitting the socket upon the outer sides of the lugs, having flat portions extending longitudinally thereof from the portion just mentioned for movement between the lugs, having grooves for the lugs extending circumferentially thereof from the flat portions and having ends providing driving faces for the lugs, and having a reduced pilot portion fitting the bore, and means operable when the lugs and driving faces are in engagement for maintaining such engagement, including a circumferentially extending wire spring nested within the socket of the driving member and having a detent portion engageable with the shank of the driven member.

9. The combination with a holder member, of a tool member detachably connected to the holder member and adapted to be driven thereby, one of said members having a shank provided at diametrically opposite points thereof with flat faces and having short grooves extending circumferentially thereof in the same direction from the remote ends of said faces, the ends of said grooves being flat and extending radially of the shank, and the other member having a socket receiving the shank and provided at substantially diametrically opposite points thereof with driving lugs for engagement with the grooves aforesaid, said lugs having radially extending flat ends for engagement with the flat ends of the grooves.

URVING G. THOMAS.